(12) United States Patent
Yuen

(10) Patent No.: US 7,143,358 B1
(45) Date of Patent: Nov. 28, 2006

(54) VIRTUAL WORLD INTERNET WEB SITE USING COMMON AND USER-SPECIFIC METRICS

(76) Inventor: Henry C. Yuen, 135 N. Los Robles Ave., #870, Pasadena, CA (US) 91101

( * ) Notice: Subject to any disclaimer, the term of this patent is extended or adjusted under 35 U.S.C. 154(b) by 957 days.

(21) Appl. No.: 09/470,871

(22) Filed: Dec. 23, 1999

Related U.S. Application Data

(60) Provisional application No. 60/118,259, filed on Feb. 2, 1999, provisional application No. 60/113,749, filed on Dec. 23, 1998.

(51) Int. Cl.
*C06F 3/00* (2006.01)

(52) U.S. Cl. ...................................... 715/757
(58) Field of Classification Search ................ 345/757, 345/848, 851, 852; 705/26, 27; 715/757
See application file for complete search history.

(56) References Cited

U.S. PATENT DOCUMENTS

| | | | | |
|---|---|---|---|---|
| 5,434,927 A | * | 7/1995 | Brady et al. ................ | 348/148 |
| 5,696,892 A | * | 12/1997 | Redmann et al. ........... | 345/473 |
| 5,736,982 A | * | 4/1998 | Suzuki et al. ............... | 345/706 |
| 5,761,326 A | * | 6/1998 | Brady et al. ................ | 340/937 |
| 6,020,885 A | * | 2/2000 | Honda ........................ | 345/757 |
| 6,219,045 B1 | * | 4/2001 | Leahy et al. ................ | 345/757 |
| 6,253,167 B1 | * | 6/2001 | Matsuda et al. ............ | 345/419 |
| 6,346,956 B1 | * | 2/2002 | Matsuda ..................... | 345/836 |
| 6,396,509 B1 | * | 5/2002 | Cheng ........................ | 345/419 |

* cited by examiner

*Primary Examiner*—Kristine Kincaid
*Assistant Examiner*—L. Nguyen
(74) *Attorney, Agent, or Firm*—Gifford, Krass, Groh, Sprinkle, Anderson & Anderson, P.C.

(57) ABSTRACT

The present invention provides a virtual world that makes surfing the World Wide Web more satisfying and pleasurable to the user. The invention is arbitive to graphically and functionally restore a user's sense of proximity or distance while surfing the web. The user is presented with the ability to traverse a two- or three-dimensional geographic terrain. Matrix, including common metrics and customized metrics, are used to enhance user interactions such that the user's overall experience during visiting a web site is made more realistic. The invention also provides a cached ahead concept whereby users are allowed to experience a smooth and no wait travel in the virtual world when travelling between web sites.

9 Claims, 2 Drawing Sheets

VIRTUAL WORLD INTERNET WEB SITE USING COMMON AND USER-SPECIFIC METRICS

REFERENCE TO PRIOR APPLICATIONS

This application claims priority of U.S. provisional application Ser. Nos. 60/113,749 filed Dec. 23, 1998, and 60/118,259, filed Feb. 2, 1999, the entire contents of both of which are incorporated herein by reference.

FIELD OF THE INVENTION

This invention relates generally to the Internet and, in particular, techniques and methods for presenting users of the World Wide Web with more life-like metrics.

BACKGROUND OF THE INVENTION

There is an increasing desire for the mass population to experience the Internet in general and the World-Wide Web in particular. When compared with real life, the Web-surfing experience is different in several respects. First, without a cable modem or other type of high-speed connection, it takes time for a site to be contacted. Once reached, the site presents a number of choices simultaneously. This pattern of alternating "wait" (for the site to be contacted) and "hurry" (for decisions to be made) often creates a stressful rather than relaxing experience, particularly for new users.

An associated characteristic of the Web which is markedly different from real life is the elimination of the sense of a "metric." There is no such as being "proximity" on the Web, and while in many situations this is a positive factor, it removes the sense of anticipation or foreseeability that is fundamental to human experience. Since all human senses are geared toward discriminating distance to prioritize reaction, Web experiences, in contrast, may tend to amplify the sense of unreality.

Many people surf the Web to contact or communicate with other people, generally, to make new friends. Currently, there are a number of configurations that this is popularly done; chat rooms, personal ads, email etc. None of which, however, presents a real-life experience of encounter.

SUMMARY OF THE INVENTION

This invention is directed to techniques which make surfing global computer networks, such as the Internet World Wide Web, more satisfying and/or pleasurable to users. Broadly, the invention simulates a "Virtual World" which graphically and functionally restores a user's sense of proximity, or distance, while surfing on the Web. In meeting this objective, a visitor to this Virtual World is presented with the ability to traverse a two- or three-dimensional geographic terrain. The visitor's icon is moved along the graphic display in the direction of various destinations representing by appropriate graphic designations. Subsequent pages are cached in the preferred embodiment so that probable new destinations are rapidly displayed, eliminating the annoying delay often associated with the choice of a subsequent page of a web site.

Metrics, including Common Metrics and Customized Metrics, are used to enhance user interactions. A Common Metric is when the geographic terrain on which the various visitors are located is common to all, so that one person can approach the other person by reducing the distance between the two. In contrast, Customized Metrics, based upon user profiles or interaction histories, are attached to a person, indicating how their "view" of the Virtual World should be constructed.

The concepts of "profiling," "metrics," "caching," and the use of graphic entry portal may be used independently, or in a wide variety of combinations to provide an idealized living environment for Web surfers, thereby optimizing their Internet experience. In the preferred embodiments, the rules are arranged in a graduated fashion, so as to be non-threatening to novices yet, with increasing sophistication, satisfying to users or dwellers.

In addition to dedicated Web sites, the invention is applicable to portals or front ends of web sites wherein, for example, an initial or early screen provides a user or visitor with a variety of choices, each connected with one or more additional screens or Web site pages. Regardless of implementation, the invention improves a user's experience during visiting a Web site in several ways, including e-commerce sites wherein each visitor is be assigned an icon that can be moved between destinations graphically represented on the site display at a visually perceptible rate, using virtual currency to purchase goods or services.

DETAILED DESCRIPTION OF THE INVENTION

Figure 1:
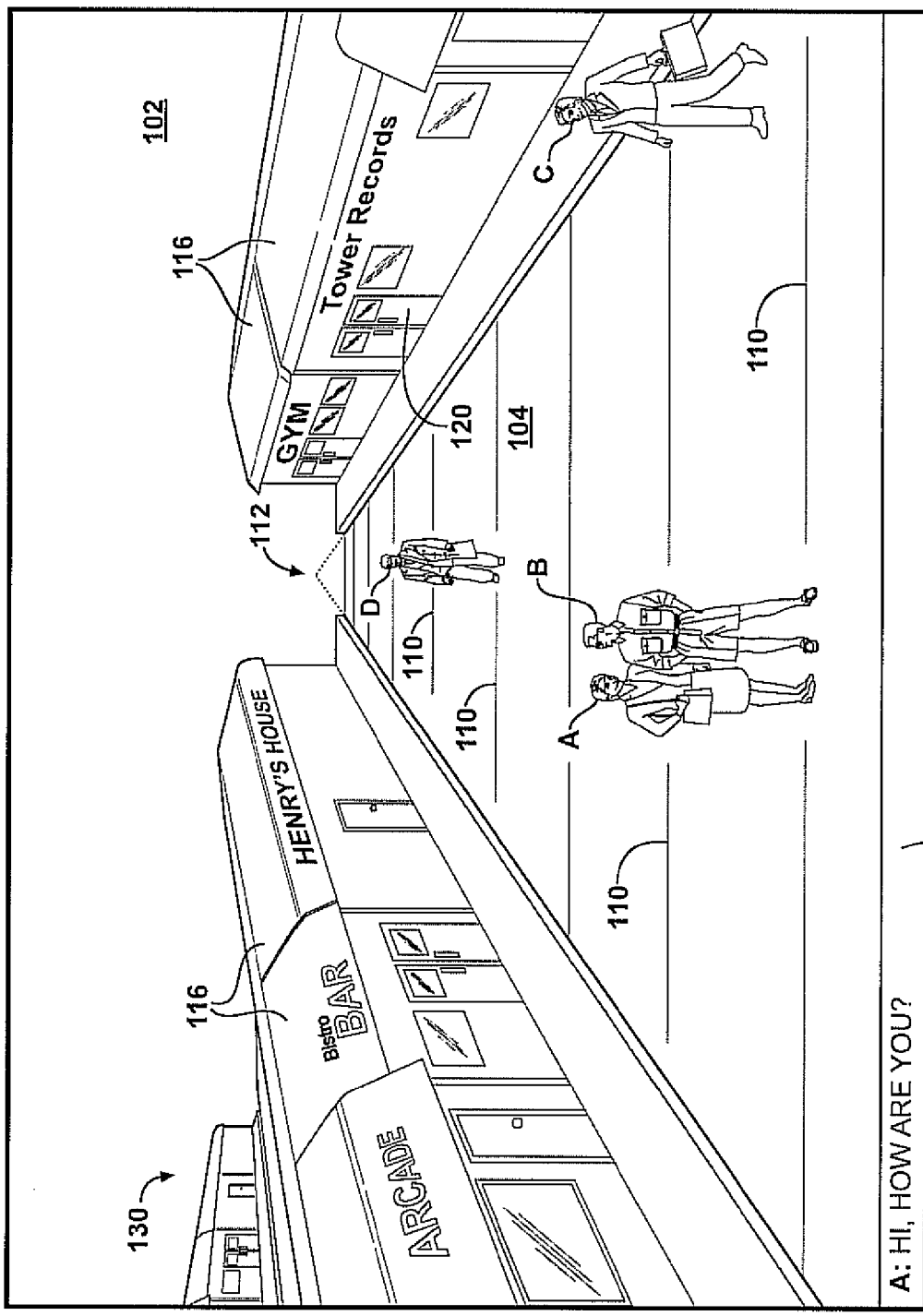
FIG. 1 is a simplified screen display visible on an Internet browser showing the way in which different visitors may move and interact with respect to a virtual street environment.

This invention addresses problem areas or needs associated with the Web to make surfing more satisfying or pleasurable. Broadly, the goal is a Web site which simulates a "Virtual World" so as to graphically and functionally restore the sense of proximity, or distance, while surfing on the Web. In accordance with the invention, a visitor to the Virtual World will be presented with a two- or three-dimensional depiction of a geographic terrain, and a means of virtual locomotion. For example, if the person wants to have a leisurely "stroll," the user can "walk," whereas, if a person wants to have a quick tour of what is available, he or she can "drive," ride a bicycle or an airliner, as appropriate, so that the "far" locations on the terrain would take more time to reach than the "near" locations, similar to a "twitch" type of video game.

The visitor icons would preferably have unique configurations which could be chosen by the visitor from a selection or created based on the profile information. The user could "walk" the icon about the site. This would cause the icon to move slowly in an intended direction. During this "walk" information could be provided to the visitor about the correlation of her profile with the profiles of other visitors currently on the site. Alternatively, the icon could display the profile information or some information about that visitor derived from the profile information. The walk would be interrupted while visitors chat with one another.

As a visitor's icon is moved along the graphic display, in the direction of various destinations representing by appropriate graphic designations, one or more of these subsequent pages could be downloaded to the user's computer and cached so that as the visitor's icon arrives at the graphics representing a subsequent page and clicks on that graphic, the subsequent page could be instantly displayed, eliminating the annoying delay often associated with the choice of a subsequent page of a web site.

As will become evident, however, certain of the concepts disclosed herein may be used independently so as to augment different configurations and enhance user interactions. But before proceeding with the description of the preferred embodiments, it would be helpful to first explain the concept of virtual metrics, as defined herein. These concepts include the Metric, Common Metric, and Customized Metric, which are defined as follows.

A Metric is used by all visitors in common, and can be characterized, for example, by a three-dimensional "time" dependent vector representing the three-dimensional space:

$$m/(t)=(x(t),y(t),z(t))$$

The distance between visitors A and B will therefore preferably be measured by the usual mathematical definition of distance between the metric associated with A at a given "time," and B at the same "time," wherein time may be real or virtual as defined in more detail below.

A Common Metric is when the geographic terrain on which the various visitors are located is common to all, so that one person can approach the other person by reducing the distance between the two, by pointing in the direction of the target person and applying velocity, for example. To accommodate many visitors (avoid overcrowding), and in order to take advantage of the preferences and habits of a person (a music lover may want to be close to the music store), Customized Metrics may be used to rearrange the reference points particular to a given person. For example, if person A prefers to be closest to the Music Store, then to the Sporting Goods Store, then to the Arcade, the Customized Metric may be used to create a set of relative distances between the three stores as well as the entry to the Virtual World, to achieve a desired effect. In this case, a set of Customized Metrics may be attached to a person, indicating how their "view" of the Virtual World should be constructed. This can be represented by a set of vectors which describes the location of each "Store" or other landscape feature particular to the person.

A particular example would be a "Main Street" which is presented to the user upon entering the Virtual World site. It will be appreciated by those of skill in the art of website design that the position or location of multiple users relative to the 2D or 3D terrain or cityscape could be tracked through multiple hypertext links indexed to the screen display. Thus, the invention could be used with existing markup languages and applicable programs in conjunction with available browsers provided by Microsoft and Netscape, for example, though the invention is not limited in this regard, and may be programmed using yet-to-be developed languages and other graphical user interfaces (GUIs).

Suppose the person chooses to "stroll" down the "street." This may be done using a mouse, joystick or any other appropriate input means to control motion by selecting a direction and establishing a pace. The "scenery," which is the aggregate of all terrain features and "visitors," will change according to his pace of progression. Thus, the person can "meet" people during the "stroll."

As a further aspect of such "encounters" between different visitors to a site, only those visitors selecting the same or a similar Common Metric will be able to "see" each other according to a separate aspect of the invention. At any time, each person is associated with a metric in the Virtual World, and he will be able to functionally interact with another person (finding out about, communicating with, or exchanging certain items with those metrically close to that individual. The type of functions that can be allowed between two (or more) persons may also be dependent on the metric, as it is in real world. Of course, "meeting" people can also be done while visiting a place with metrics turned off or partially disabled.

Different users may also be provided with different metric locations with respect to their "favorite" stores. That is, with respect to a user A, the entry point might begin with Music, then progress to Sports, Arcade, and Video. For B, the progression might be Sports, Music, News, and Arcade, depending upon their respective Customized Metrics. This Customized Metric may change if a person's preferences changes, or for any other reason, such as the fact that he has already visited a certain store many times, or is "banned" from a store, etc.

FIG. 1 shows a simplified screen display 102 adhering to the principles disclosed herein. Although schematic buildings and stick figures are used in this illustration, it should be understood that the scenery may be as realistic and life-like as the technology allows at a given time. The display 102 would be seen by a user, in this case user "A" on a standard Internet browser of the type provided by Microsoft and others. It should also be understood that while this view is not seen by user A, the view seen by other users would typically be very different, depending upon their location, the use of customized metrics, and so forth.

The display 102 shows a virtual street 104 and a number of buildings 116 located on the virtual street. In the preferred embodiment, some sort of graphical representation is used to depict distances, for example, the use of perspective based upon one or more vanishing points such as 112. In this case, horizontal lines 110 are conveniently used to show where visitors would be located from front to back relative to the screen display.

In this particular view, four visitors A through D, are shown, though, typically, the street could be much more crowded. In this case, it is assumed that there are not many users on line at this time, or person A has adjusted the use of profile so that only a few people are visible. Although different icons may be used to represent the visitors, in the preferred embodiment, they are as life-like as possible. For example, utilizing digital cameras and web-cam technologies, people may paste their own faces into the icons or, for that matter, their own bodies, using real-time movements, if possible through the use of color-keying and like techniques. Using this arrangement, a user may go from front to back by clicking proximate to the lines 110, and may also move from side-to-side by clicking and dragging their own icon, for example. To go great distances such as different cityscape 130, the user would first double-click on that location and a new scene would appear. The same holds true for the entry of stores such as doorway 120, which may be gone to directly through double-clicking or pointing. Alternatively, by clicking on the line associated with visitor D, which is already oriented to the entryway 120, a user may click and drag their icon into a "store," in which case the scene would also change to show the inside of the store.

In this particular example, it is assumed that A and B are close enough to see one another and "converse," either through chat box 140, or using actual audio, as the technology allows. User C, although visible by at least user A, may be too far away to talk in this example. The same is true of user D, which is presumably visible only because user A liked the profiles of user D enough that user A wished for user D to be seen regardless of distance.

Thus, according to the invention, the Main Street 104 or other terrain will appear different to different people, depending on their habit or stated preferences, though the Stores 116 on the Main Street, which can be other Web Sites to which the Virtual World is a portal, would preferably be used as points or locations in common. For example, a Music Store (i.e., "Tower Records," which may be operated by a separate Web site), may be the nearest store to person D, because person D is a music lover. Such a preference may be determined by surfing habits or through an expressly entered form or other input. Person B may be far away from person D, however, in the event that Person B is not a music lover or, at least, has not indicated a preference for music. Nevertheless, if Persons A and B happen to both visit the same store, they will be "close" to each other, and may "encounter" each other using Common and Customized Metrics.

The profile for each visitor is preferably generated according to the invention based on the visitor's interests and personal status. The profile characteristics may be determined by a variety of techniques including having a new visitor fill out a questionnaire, or take a test. Thus, the "constitution" of a visitor may be derived from a number of factors, including express answers to questions about age, height, weight and agility for determining physical constitution; outgoing, reserved etc. for mental constitution, etc.

Alternatively, or as a supplement to a questionnaire, a profile may be generated from records of the visitor's previous purchases from that site or other locations. For example, assuming the Web site sells audio records such as CDs, a first-time visitor might be queried as to her musical preferences such as rock, jazz, classic, instrumental, or vocalist. Using that information, the visitor might be provided with a custom generated list of older selections and asked to rate them in terms of preference. Information might also be solicited as to age, gender and residence. Using this information, the constitution of a visitor may be created.

Selection from prefabricated character groups may also be used, involving icons with description of mutually compromising characteristics to prevent the creation of a superman, Virtual World experience (injuries, rewards, type of stores visited), equipment (sight and sound enhancement devices, weapons and shields), or a combination of any or all of the above. The constitution will preferably change as a result of actual time passage and Virtual World experience.

Such a profile or user constitution may be used in several different ways. One application would be to tailor the choices for subsequent pages presented to a user. If the site has pages for musical categories, the selection of pages from which the user can choose can be tailored based on the profile information. For example, an eighteen year old rock and blues fan might be presented with a category of recent artists but not the Boston Symphony. By way of example, a visitor to a book selling site may send a message to another visitor with a similar profile in the following form:

"Hello visitor M-33. Since our profiles are so similar you must be into novels about American frontier life. I just finished "Lewis & Clark" and am looking for something similar. Any suggestions?"

Such a dialogue could progress in any direction from this point, but would hopefully be centered about book selections so as to enhance the possibility of sales to the two visitors. The visitors could also exchange their e-mail addresses or the like so that they can continue the relationship if they so choose. This arrangement combines social aspects of a chat room with the commercial aspects of an e-commerce site, and thus enhances the attractiveness of both experiences.

In the case of a pay-per-view movie site, some of the locations might be pages containing previews of some of the movies. The movies displayed on the site might be chosen based on the user's profile. That is, the pay-per-view site might have several alternative entrance portals depending upon the user's interest in new releases, comedies, westerns or the like. The visitor would be assigned to an appropriate graphic portal based upon the profile information. Other current visitors having similar profile information would be assigned to the same graphic portal and each visitor would be assigned an icon which would be displayed initially at a graphic entrance door to the site. The site might also include information locations where books or magazines about movies could be ordered, etc.

The Virtual World made possible by the invention keeps track of an absolute reference for all the terrain. The Sports Store will be identified by a time independent set of Metrics, such as X and Y, or X, Y, and Z, with other coordinates being used for other stores or locations. The absolute location of a person would therefore be a superposition of the Common Metric and the Customized Metric, which ensures that when two people arrive at the Music Store, they will be metrically close to each other, yet each may take longer or shorter from its current location to arrive at a store.

Figure 2:
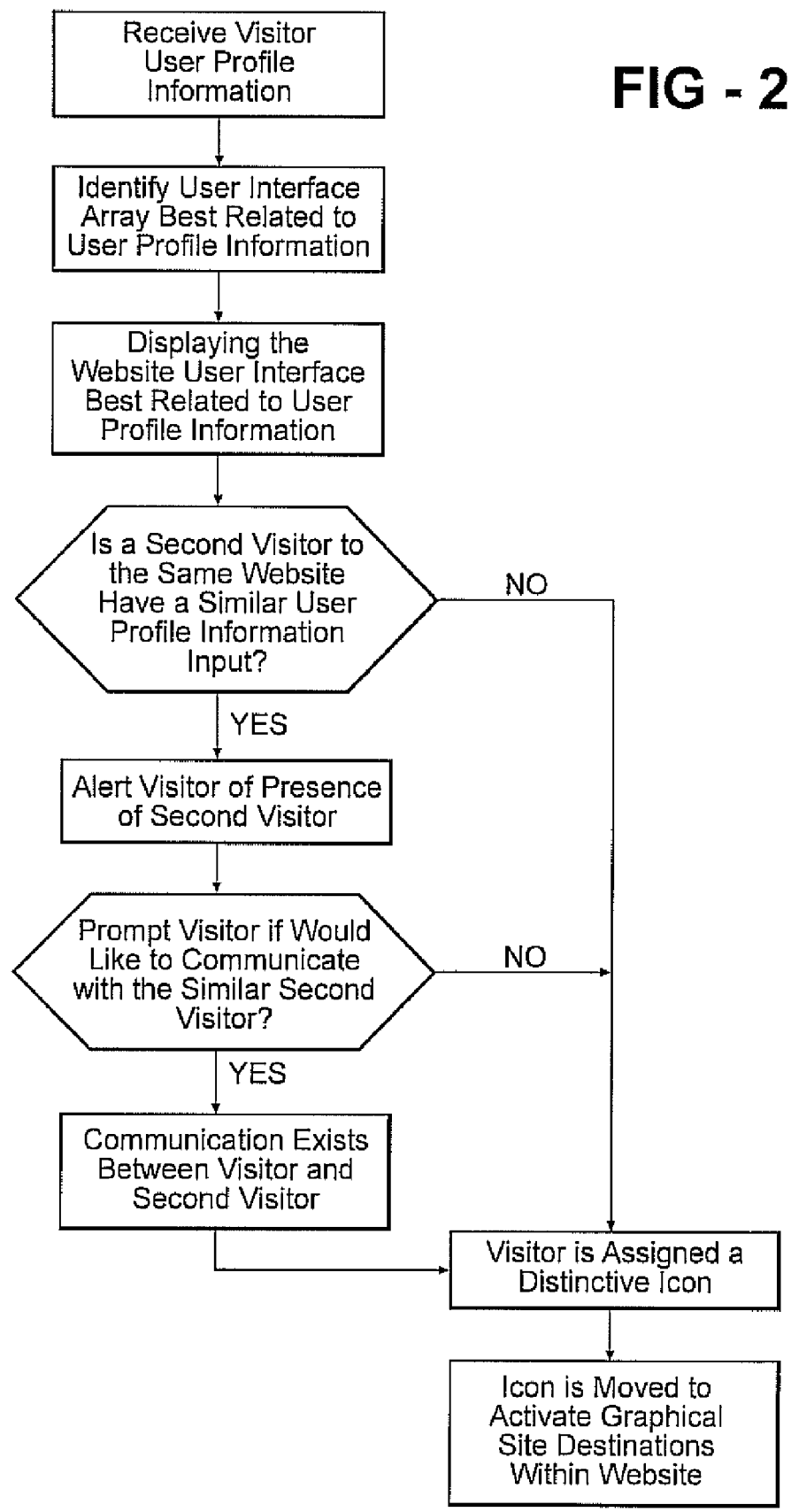
FIG. 2 is a flow diagram which shows steps taken to identify and profile multiple visitors to the environment.

The use of metrics improves the user's experience while visiting a Web site in several ways. First, the social attributes of a chat-room are added to commercial sites by allowing the possibility of interaction with other visitors, as well as the exchange of information which assists the visitor in moving through successive pages of the web site. Secondly, the irritating delay between the time the page of the web site is selected and the graphics and audio information associated with that new page appear on the user's screen is minimized. In addition, the presentation of information contained on the web to a visitor can be customized to enhance the experience and increase the possibility of a "sale" to a visitor. These concepts are incorporated in the flow diagram of FIG. 2, which depicts a Web site front end according to the invention.

In addition to the improvements and advantages according to the above descriptions, the invention also anticipates the following configurations:

Virtual Time and Cache The time on a site according to the invention is preferably integrated with a cache-ahead concept. In order to eliminate the "wait" and "hurry" syndrome described above, the Virtual World will preferably start contacting the locations, including Web Sites, which are "closest" to a person or that are "most likely" to be visited. The latter condition will preferably take into account the direction of movement, or the history of visits, assuming that a person is less likely to visit a site that was just left. The cache ahead approach allows the person to experience a smooth and "no wait" travel in Virtual World. It will be appreciated that the inventive aspects of "proximity," "direction," "history" and "preference" to the caching strategy may be used independently or in combination to produce a desired effect.

Sight, Sound and Action. When two persons are within a certain proximity of each other, certain communicative functionalities are preferably enabled. For example, at distance x, the two persons can see each other. The sight function (as well as other functions) may be either digital (yes or no) or graduated, thereby increasing resolution. Similarly, at distance y, the two individuals may be within "ear shot" and may speak to each other. Other actions such as touch (a pleasing touch may result in some form of symbolic reward, such as a bigger or brighter icon or even an external gift of coupons, discounts etc.), bump (causing loss of direction), hit (may cause loss of certain attributes and may create a negative result) etc. can also be implemented. With appropriate tactile sensors and manipulators, virtual touching could also be implemented.

In this connection, the results of an action is dependent on the interaction between the two parties, and the "constitution" of each party, as defined above. For example, a touch by an "attractive" person, as defined by the touched person, can create a larger reward than by an unattractive person (which may result in a negative reward). Similarly, a strike by a "strong" person (absolutely defined) against a "weak" person (absolutely defined) may result in greater damage, and vice versa. The "constitution" of a given person is discussed below.

One possible element is that the prefabricated icons takes on known celebrity identities such as Marilyn Monroe standing for beauty and sexiness, Samson standing for strength etc. Another element is to distinguish different icons of the same celebrity by color or variation (Marilyn in white; fat Marilyn etc.).

Self versus Avatar. A character according to the invention may also be a Self or an Avatar. One possible element is used to distinguish a Self character and an Avatar visually (such as a halo on the character icon); another element is to allow each visitor to have one Self and a finite number Avatar. Other modalities could be used to confine the Self and Avatars to different worlds, or to facilitate different rules of interaction among Self-Self, Self-Avatar, and Avatar-Avatar encounters. For example, Avatar-Avatar can tolerate physical combat, while Self-Avatar cannot. Another example is for Avatar to be able to see a Self, but cannot talk to a Self etc. Another element is for the development of a Self character follows one set of rules while the development of an Avatar follows another set of rules.

Cloaking a Self. A person may also cloak a Self character, allowing only certain attributes to be apparent. There may be rules for cloaking and uncloaking a Self character. Uncloaking may be restricted to certain recipient, and may be considered an act of intimacy.

Encounter. One popular objective of Web surfing is to encounter people of certain characteristics. One characteristic of the Virtual World is to allow such encounters. As mentioned above, rules of encounters among Self characters, Avatar characters and Self-Avatar may be different.

Meeting and "Mood". One recent Japanese fad is for people to carry small radio transceivers with certain characteristics entered (as well as characteristics of the person they desire to meet), so that when two person with a match (defined by some rules) come within certain proximity, the transceiver will emit a signal signifying the match. The Virtual World may have rules supporting a similar encounter. When two characters come within a certain proximity, and the characteristics one matches the desirability of another, an alert will occur to both.

Rules of communication governing possible interactions would preferably be instituted, which may be set externally but customized to some extent (for example, the external rule may be that if both sides match desirability and characteristics, two-way communication is established; if A desires B's characteristics, but B does not desire A's characteristics, then A may send a finite number of "common" messages within a time limit to B, but B may choose not to respond, thereby not allowing the communication to continue; against these external rules, a person may set his "mood" rules, allowing messages from unmatched people to reach him or not, etc.)

Communication. Communication between two persons on the Virtual World can be through text, voice or video. Conversations may be private or public. Meetings can be held in public or in a "private abode" (see below).

Virtual Private Abodes. A private abode (such as "Henry's House" in FIG. 1) is a personal web site which can accommodate Virtual World functionality. A person may construct a private abode on the Virtual World, and customize or "decorate" the abode according to his taste. There may be desirable "tools" (which are software development tools), or "location" or "views" (which may be the Alps) for the abode supplied by Virtual World, for which Virtual World may charge "rent" (or different classes of membership fees). A person may "return home" when he signs into Virtual World, and invite others to visit him or throw a party in his virtual home.

Virtual Currency. According to yet a further aspect of the invention, a special currency would be established on the Virtual World when a visitor exchanges real world currency to Virtual World currency. The exchange will be a secured transaction for the purchase of electronic currency (Virtual World Currency or V.C.). V.C. may be used to purchase physical items in Virtual World Stores (which are operated by Virtual World or associated web sites under agreement to honor Virtual World currency, pay rent, purchase Virtual Transportation (such as Virtual Autos, Virtual Bikes), purchase Virtual Services (games, rides, e-cards, pictures, graphics, videos, music etc.). Virtual currency may be earned from one person by another.

"Paying" currency from one person to another in the Virtual World would preferably be done through a secure transaction refereed by the Virtual World site, which keeps a record of all V.C. and their transactions. Virtual World Currency could also be floating; that is, bid up or down according to the desirability of the Virtual World shopping experiences or other economic considerations. This may one day lead to the trading of Virtual World Currency against world currencies.

Stores in Virtual World. In addition to stores that may be erected by Virtual World itself, Virtual World may contract with other Web Sites to "rent out" store fronts to them. Virtual World may charge rent in the form of up front payment, monthly payment, and/or per transaction fee. Virtual Store operators will ensure that its store front in the Virtual World will be interoperable with Virtual World metric system, encounter rules, transaction rules and currency rules.

I claim:

1. A method of user interaction on the world-wide web, comprising the steps of:

defining a virtual world using at least one web site, the virtual world including a virtual geographic terrain with a set of virtual locations;

displaying the virtual geographic terrain and virtual locations to a plurality of visitors to the virtual world, each being interconnected to the web site through the world-wide web;

identifying each visitor to the virtual world with a symbol superimposed on the geographic terrain;

providing a facility whereby visitors may traverse virtual geographic terrain and visit virtual locations by moving the symbols;

predicting a next location where a visitor might traverse within the virtual world based upon previous symbol movements;

caching information to provide a more immediate presentation of the next location; and establishing a common metric with respect to each visitor, enabling one visitor to interact with another visitor in accordance with the metric.

2. The method of claim 1, further including the step of defining a spatial perspective within the virtual world using one or more vanishing points.

3. The method of claim 2, wherein different visitors see the virtual world from a different perspective.

4. The method of claim 1, wherein the virtual locations include one or more virtual commercial enterprises offering goods or services for purchase by the visitors.

5. The method of claim 1, further including the step of profiling visitors to determine their preferences.

6. The method of claim 5, further including the step of using the visitor preferences to determine the level of interaction between two visitors.

7. The method of claim 1, wherein the interaction between two visitors is textual.

8. The method of claim 1, wherein the interaction between two visitors is audible.

9. The method of claim 1, wherein the symbol for a visitor includes a real-life graphical representation of that visitor.

* * * * *